US006786479B2

(12) United States Patent
Gerlier et al.

(10) Patent No.: US 6,786,479 B2
(45) Date of Patent: Sep. 7, 2004

(54) BANKNOTE STORE WITH A ROTATABLE STRUCTURE HAVING BANKNOTE-STORING REGIONS

(75) Inventors: Andre Gerlier, Sciez (FR); Roberto Polidoro, Geneva (CH)

(73) Assignee: Mars Incorporated, McLean, VA (US)

( * ) Notice: Subject to any disclaimer, the term of this patent is extended or adjusted under 35 U.S.C. 154(b) by 108 days.

(21) Appl. No.: 10/032,784

(22) Filed: Dec. 26, 2001

(65) Prior Publication Data

US 2002/0093133 A1 Jul. 18, 2002

(30) Foreign Application Priority Data

Dec. 28, 2000 (EP) ............................................ 00311730

(51) Int. Cl.$^{7}$ ............................ B65H 1/12; B65H 1/28; B65G 57/11

(52) U.S. Cl. .................... 271/3.01; 271/3.11; 271/3.14; 271/160; 271/163; 414/794.8; 414/790.4; 414/925; 414/926; 221/1

(58) Field of Search ............................... 271/3.01, 3.07, 271/3.11, 3.14, 213, 217, 163, 160; 414/794.8, 790.4, 925, 926; 221/1

(56) References Cited

U.S. PATENT DOCUMENTS

| | | | | |
|---|---|---|---|---|
| 3,888,267 A | * | 6/1975 | Gautschi | 271/3.21 |
| 3,899,103 A | | 8/1975 | Shigemori et al. | |
| 3,929,326 A | * | 12/1975 | Seragnoli | 271/3.01 |
| 3,930,581 A | * | 1/1976 | Gray | 209/534 |
| 4,106,667 A | * | 8/1978 | Lynott | 221/1 |
| 4,515,288 A | * | 5/1985 | Atalla | 221/1 |
| 4,547,113 A | * | 10/1985 | Welch et al. | 414/49 |
| 4,577,779 A | * | 3/1986 | Atalla | 221/1 |
| 4,710,351 A | * | 12/1987 | Wogoman | 422/50 |
| 5,020,787 A | * | 6/1991 | Arikawa | 271/3 |
| 5,199,697 A | * | 4/1993 | Yamada et al. | 271/122 |
| 5,560,594 A | * | 10/1996 | Gosslinghoff | 270/52.24 |
| 5,719,383 A | * | 2/1998 | Forrest | 235/379 |
| 5,735,516 A | * | 4/1998 | Gerlier et al. | 270/60 |
| 5,876,028 A | * | 3/1999 | Francke et al. | 271/3.12 |
| 5,996,993 A | * | 12/1999 | Arikawa et al. | 271/258.01 |
| 6,077,030 A | * | 6/2000 | Frochte et al. | 414/789.9 |
| 6,338,479 B1 | * | 1/2002 | Van Der Werff et al. | 271/3.01 |
| 6,371,368 B1 | * | 4/2002 | Owens et al. | 235/379 |
| 6,568,673 B2 | * | 5/2003 | Mochizuki et al. | 271/213 |

FOREIGN PATENT DOCUMENTS

| | | |
|---|---|---|
| DE | 42 02 664 A1 | 7/1993 |
| EP | 0 151 808 A2 | 8/1985 |
| EP | 0 892 372 A1 | 1/1999 |
| FR | 2 356 588 | 1/1978 |
| WO | WO 00/52649 | 9/2000 |

* cited by examiner

*Primary Examiner*—Donald P. Walsh
*Assistant Examiner*—Daniel K Schlak
(74) *Attorney, Agent, or Firm*—Fish & Richardson P.C.

(57) ABSTRACT

A banknote store comprises a rotatable structure such as a drum which has a number of banknote storage regions arranged around its periphery. Each stores a stack of banknotes, the stacks growing inwardly as banknotes are added. The drum can be rotated to bring each storage region into proximity to means for delivering banknotes to and/or retrieving banknotes from the store.

16 Claims, 5 Drawing Sheets

BANKNOTE STORE WITH A ROTATABLE STRUCTURE HAVING BANKNOTE-STORING REGIONS

This invention relates to stores for value sheets such as banknotes, cheques or the like (herein referred to collectively as "banknotes").

In many apparatuses it is desirable to provide multiple banknote stores for various reasons. For example, in a banknote handling apparatus it is desirable to have a cash-box store, an escrow and in some circumstances a store for forgeries. It has also been proposed to provide a banknote apparatus in which banknotes of different denominations can be individually dispensed, in which case it is desirable to have respective stores for the different denominations.

However, providing multiple stores each with their own mechanisms for delivering and, possibly, removing banknotes results in a large, complicated and expensive apparatus, especially as many stores require pistons with a large stroke for insertion of banknotes.

It is known (see for example EP-A-0 791 211, incorporated herein by reference) to provide an escrow store in the form of a drum having a belt around it, the arrangement being such that a stack can be gradually built up on the drum, the stack being held in place by the belt, by feeding banknotes in succession to the drum in synchronism with the rotation of the drum. However, this arrangement allows only a relatively small number of bills to be stacked, thereby limiting its usefulness.

Aspects of the present invention are set out in the accompanying claims.

According to a further, independent aspect of the invention, banknotes are stored in one, or preferably a plurality of, storage regions displaced around the axis of rotation of a common structure. The structure can be rotated to bring any selected access region into proximity to means for delivering and/or removing banknotes to/from the structure. Accordingly, multiple banknote storage regions can be provided in a compact manner, and can share a common delivery and/or removal means. Each stack extends inwardly, generally towards the axis of rotation (though not necessarily exactly radially), and is arranged so that the location of the top of the stack does not alter as the stack grows and/or shrinks; thus, the overall size of the structure does not change, and a large number of banknotes can be stored.

In the preferred embodiment, banknotes are individually removable from each region so they can, for example, be dispensed as change. To facilitate individual removal, the removal means may incorporate a suction means which is arranged to draw the uppermost banknote from a stack thereof.

Arrangements embodying the invention will now be described by way of example with reference to the accompanying drawings, in which:

FIG. 1 schematically shows a first banknote store in accordance with the invention;

FIGS. 2*a* to 2*j* schematically demonstrate how banknotes can be delivered to and removed from a store in accordance with the invention;

FIG. 3 schematically illustrates a further banknote store in accordance with the invention;

Figure 1:
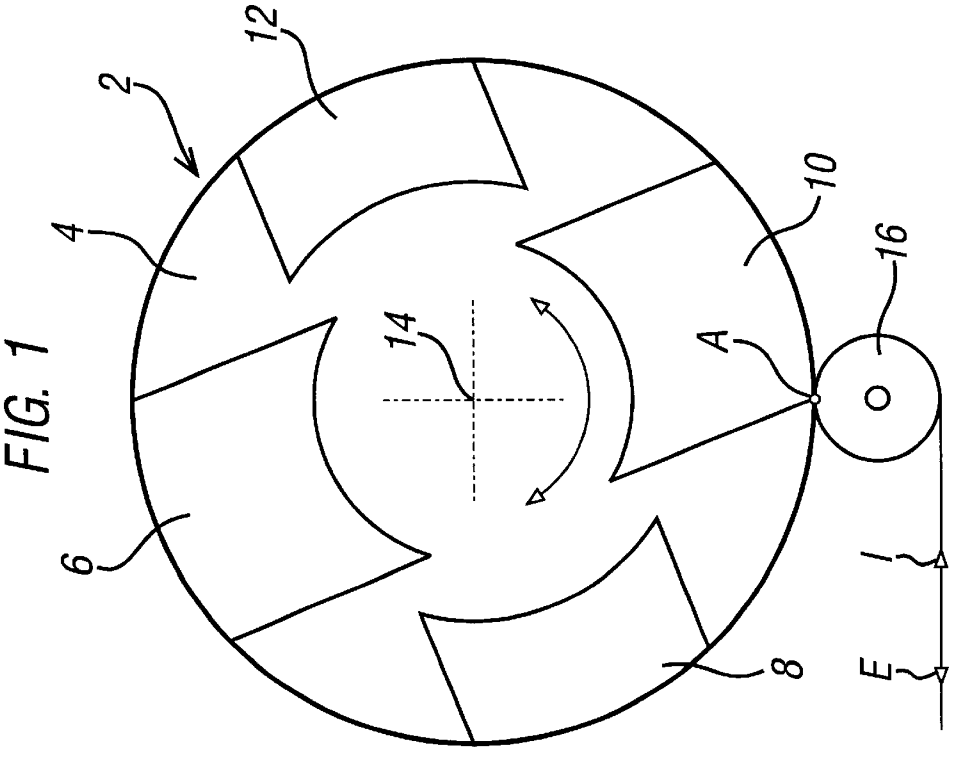
Figure 2A:
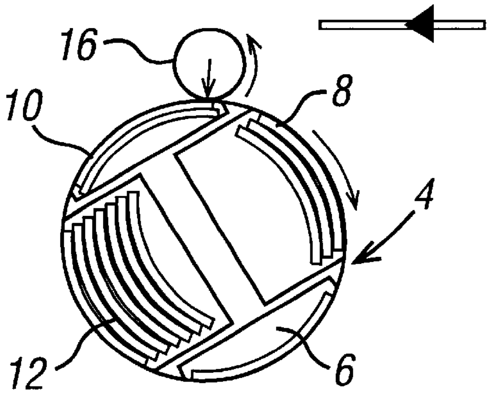
Figure 2B:
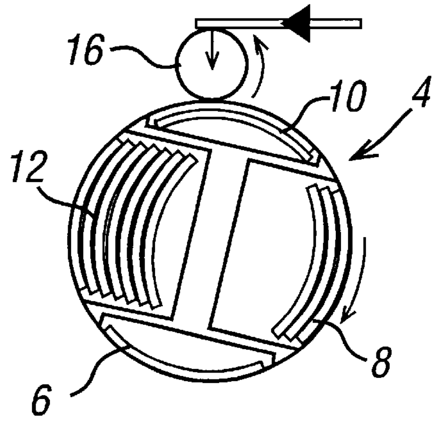
Figure 2C:
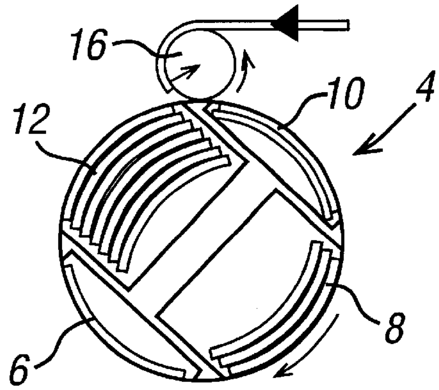
Figure 2D:
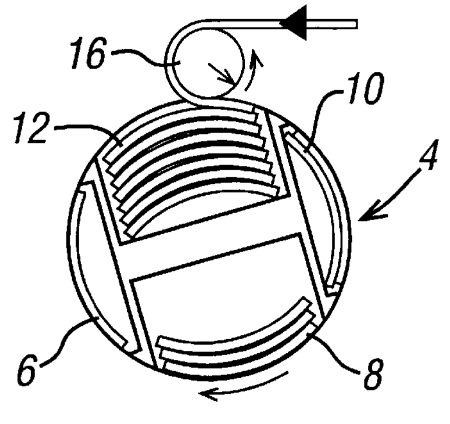
Figure 2E:
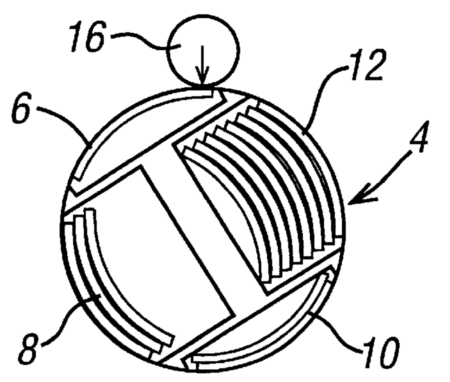
Figure 2F:
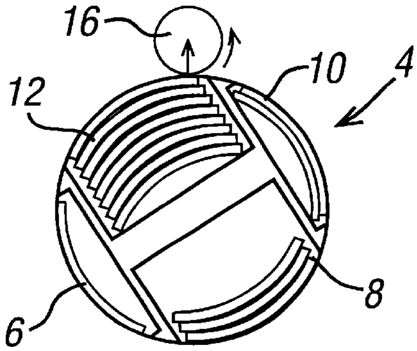
Figure 2G:
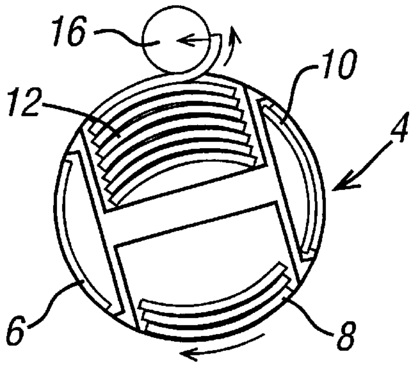
Figure 2H:
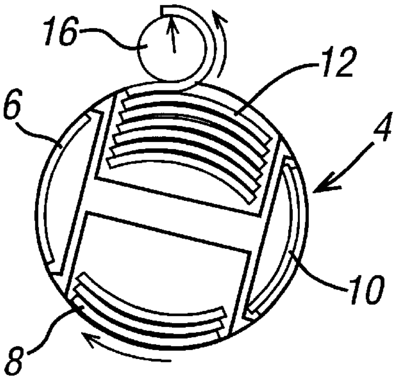
Figure 2I:
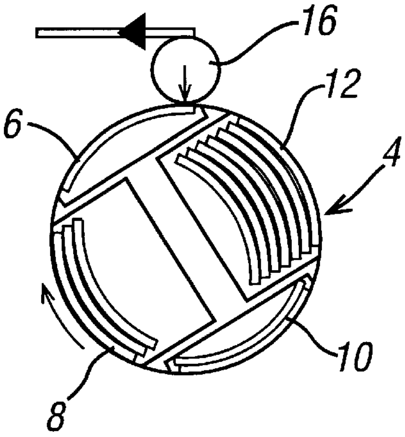
Figure 2J:
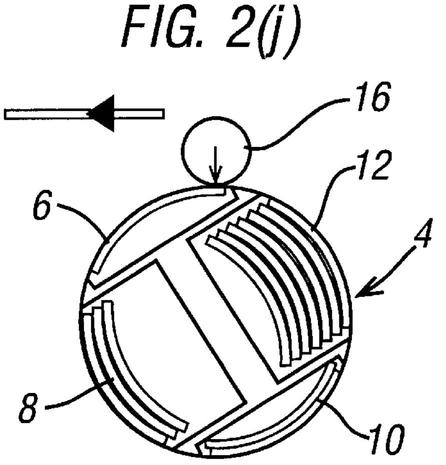

Referring to FIG. 1, a banknote store 2 comprises a storage drum 4 having, in this case, four storage regions or compartments 6, 8, 10 and 12. The storage compartments are displaced around the circumference of the drum and each extends radially inwardly from the drum periphery and can accommodate a stack of banknotes, the height of each stack being in this embodiment substantially parallel to a radius of the drum. Each compartment is preferably arranged to store a single, respective banknote denomination. The radially outer part of each storage region includes an access region at which banknotes are added to or removed from the storage region.

In order to provide room for more storage regions around the circumference of the drum, the banknotes are preferably stored with their longer dimension parallel to the axis 14 of rotation of the drum.

Biasing means (not shown in FIG. 1) are provided for biasing the stacks of banknotes radially outwardly, the stacks being held in position by at least one belt (not shown in FIG. 1), preferably an endless belt, extending around the periphery of the drum. The belt does not extend around the complete periphery; instead, there is an insertion/removal region, including the point A, which is left open to permit banknotes to be added to or removed from the store. The insertion and extraction of banknotes is achieved using a roller 16.

In operation, if a banknote is to be added to a storage region of the drum, the banknote is fed in the direction of arrow I while the roller 16 is rotated in an anti-clockwise direction and the drum 4 in a clockwise direction. The feeding of the banknote is synchronised with the position of the drum 4, such that the leading edge of the banknote reaches the point A at the same time as the leading edge of a selected storage region (for example storage region 10 as shown in FIG. 1), the selection being based on the denomination of the banknote. Continued rotation of the drum 4 and the roller 16 will result in the banknote being progressively rolled on to the top of the stack of banknotes in the storage region, thus avoiding the need for a pusher plate to transfer the banknotes to the stack.

Removal of a banknote is accomplished by reversing the directions of rotation of the drum 4 and the roller 16. Preferably, the roller 16 is provided with suction means (not shown in FIG. 1), to peel off the uppermost banknote in one of the storage regions, the suction means thereafter releasing the banknote so that it can travel away from the store 2 in the direction of arrow E.

FIG. 2 illustrates the banknote insertion and extraction operations in more detail with reference to a drum 4 having two small and two large storage regions, the operations involving adding a banknote to and removing a banknote from the storage region 12. Although the drawing diagrammatically illustrates only a few banknotes in each storage region for purposes of clarity, in practice each storage region (or at least the two larger ones) can hold several hundred banknotes. The suction means of the roller 16 is indicated by an arrow. This represents the point on the roller at which the suction means operates, and also indicates whether the suction means is providing suction (when the arrow is pointing radially inwardly) or whether the operation is reversed to provide pressure (when the arrow is pointing radially outwardly). FIGS. 2(*a*) to 2(*e*) represent the insertion operation, and FIGS. 2(*f*) to 20) the extraction operation.

Figure 3:
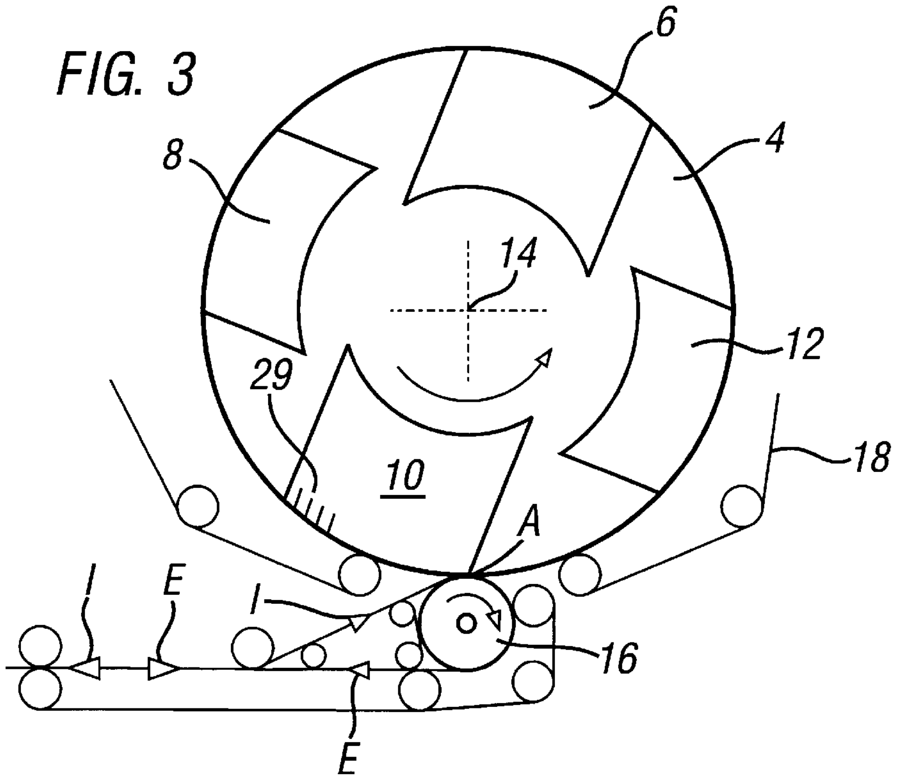

FIG. 3 shows a modified version of the store of FIGS. 1 and 2, like reference numbers representing like integers. In this case, a system of belts is provided for delivering banknotes in the direction of arrows I over the roller 16 to the drum 4 and for extracting the banknote in the direction of arrows E under the roller 16. Accordingly, the roller 16 rotates clockwise and the drum 4 anti-clockwise for both insertion and extraction of banknotes. Part of one of the belts around the drum periphery is shown at 18.

Figure 4:
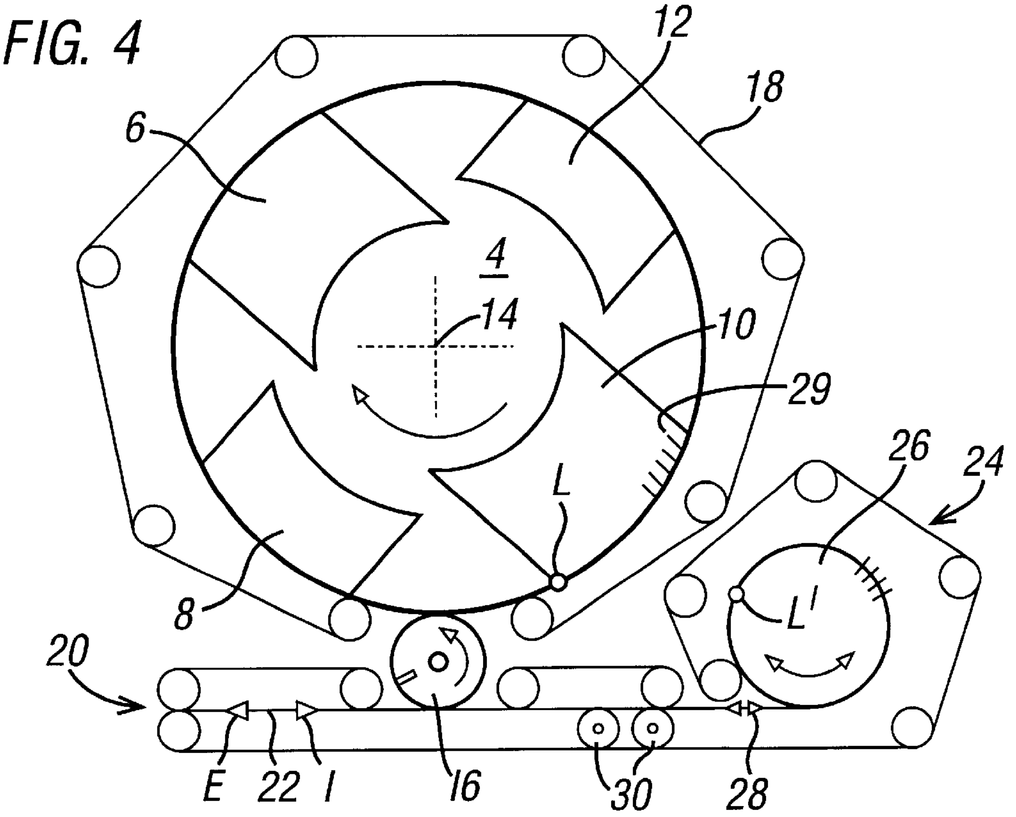
FIG. 4 illustrates yet another banknote store in accordance with the invention.

FIG. 4 shows a further modification, and again like reference numbers represent like integers. Banknotes to be inserted on the drum are fed into an entry/exit 20 and are delivered in the direction of arrow I to the roller 16. Using suction, the roller picks up the banknote from a belt 22 and feeds it to one of the storage regions 6, 8, 10 or 12. During this operation, the roller 16 is moving anti-clockwise and the drum 4 clockwise.

The drum 4 and roller 16 are rotated in the same directions to extract banknotes individually from the storage regions. Each banknote is picked up by the suction means in the roller 16 and fed to the belt 22, which carries the note to an intermediate store, or escrow, 24. This may be of a known type (see for example EP-A-0 791 211). Successive notes are fed from the drum 4 to a drum 26 of the escrow 24 while the drum 26 is rotated anti-clockwise. The movement of the drums 4 and 26 and intervening roller 16 and belts are controlled such that the leading edge of each note arrives always at the same point on the drum 26, so that a stack of banknotes is progressively built up on the drum 26. Then, by rotating the drum 26 clockwise, the stack is released from the escrow and the notes are fed as a bundle in the direction of arrow E to the entry/exit 20.

The operation of the arrangement of FIG. 4 is such that, if successive banknotes from the store 10 are fed to the escrow 24, the leading edges of those banknotes, which will be at point L when the banknotes are stored in the drum 4, will always arrive at the same position, for example L' on the drum 26 of the escrow. Preferably, this also applies to the banknotes stored in the other storage regions, 6, 8 and 12, so that a single bundle of banknotes formed on the drum 26 can be derived from a plurality of the storage regions.

To facilitate this synchronisation, the belt 28 feeding banknotes to the drum 26 may be formed separately from the belt 22 which receives banknotes from the drum 4, the belts 22 and 28 being selectively operated using, for example, clutches to engage rollers 30 in response to sensors, so that the banknotes reach the drum 26 at the correct position.

The embodiments described above are particularly suited for storing respective denominations in the different storage compartments and for dispensing banknotes in selected combinations as change. However, it would be possible for one or more of the compartments to store banknotes of multiple denominations. It may not always be required for such stored banknotes to be retrievable individually from the banknote store. However, if it is desired to provide for individual retrieval of banknotes stored in a multi-denominational stack, then the embodiments of FIGS. 3 and 4 are particularly suited for this. In FIGS. 3 and 4, the leading edge of the banknote as it is stored on the drum 4 is always in a predetermined position, and this same edge is also the leading edge when the banknote is retrieved from the drum. Accordingly, the retrieval operation can commence at a known position with respect to the drum. It doesn't matter if the banknotes are of different sizes, and particularly different widths, because this will merely lead to their trailing edges being located at different positions as indicated at 29 in FIGS. 3 and 4.

Accordingly, retrieval of banknotes from a multi-denominational stack can easily be accomplished, for example for the purpose of transferring the banknotes to a different store, refunding all the stacked banknotes, or refunding selected individual banknotes from the stack (the remainder possibly being sent back to the store or sent to a different store).

The belt 18 of FIGS. 3 and 4, together with a similar belt used in the embodiment of FIG. 1, may be used for both holding the stacks in position against the biasing means as well as imparting rotational movement to the drum 26.

Figure 5:
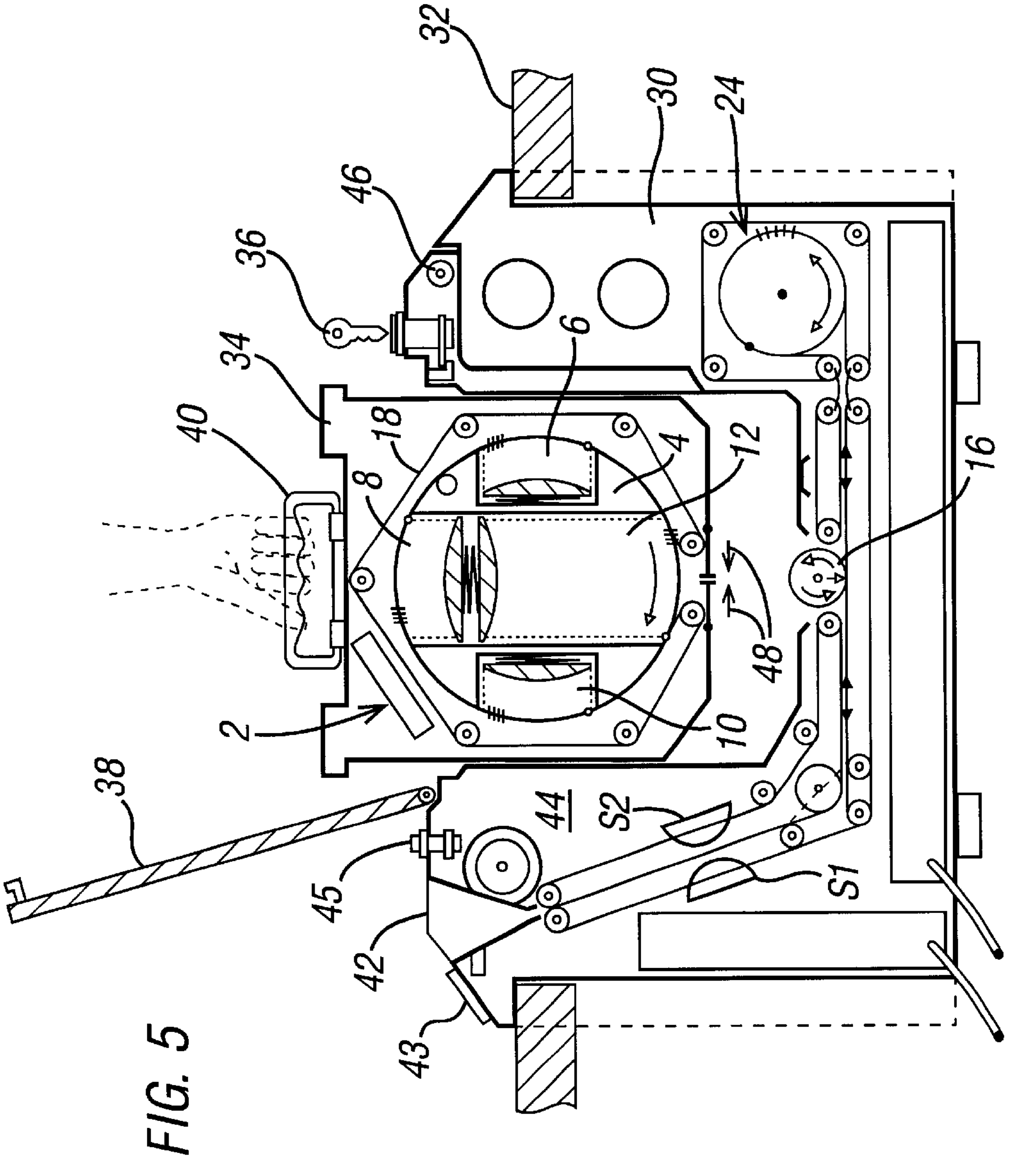
FIG. 5 shows a banknote handling apparatus incorporating a banknote store which operates using the principles of the present invention.

FIG. 5 shows a banknote handling apparatus incorporating a banknote store which operates on a similar principle to that of FIG. 4. The apparatus is intended for installation at a till, and is arranged to receive individual banknotes, test them for denomination and authenticity, store them in the banknote store 2 and refund selected denominations as a bundle.

The apparatus comprises a main body 30 which is intended for installation in an aperture in a cashier's desktop 32. The banknote store 2 is mounted in a removable housing 34 containing the drum 4 and the surrounding belt 18. The housing 34 can be accessed by using a key 36 to unlock a lid 38. The housing 34 can then be removed using a handle 40, leaving behind the means for feeding banknotes to and removing banknotes from the banknote store 2, including the roller 16. The banknotes are still retained in the drum 4 by the belt 18.

In operation, banknotes are inserted into an inlet/outlet 42 in the upper surface of the main body 30. The banknotes are individually fed by belts between sensors S1 and S2 to permit their validation. A display 43 provides information in dependence on the results of the validation. If the banknotes are found to be invalid, they are refunded by reversing the movement of the belts to present them at the inlet/outlet 42. Otherwise, they are fed to an appropriate one of the storage regions of the banknote store 2. Various amounts of money can be refunded by sending selected denominations from the store 2 to the escrow 24, from which they are refunded as a bundle to the inlet/outlet 42.

The main body 30 has a subsidiary section 44, in which the banknote store 2 is housed. By unlocking another lock 45, the subsidiary section 44 can be pivoted upwardly about a hinge 46 for easy access to the banknote path from the inlet/outlet 42 to the roller 16, and from the roller 16 to the escrow 24.

The housing 34 has an aperture for receiving the roller 16, this aperture being automatically closed by means of biased shutter elements 48 when the housing 34 is removed.

Banknote stores according to the present invention can be designed for a variety of different applications. For example, the banknote store of FIG. 5 has three relatively small storage regions, 6, 8 and 10, each arranged to store banknotes of a respective single denomination, so that these banknotes can be used for providing change. Preferably, these banknotes are of small denominations. The fourth storage region, 12, is substantially larger and is used for storing all other denominations, in addition to the same denominations stored in the other regions 6, 8 and 10 when those regions contain a sufficient number of banknotes. The banknote store 2 therefore functions as a main cashbox storing banknotes which are removed when the banknotes are to be collected, together with a store for banknotes payable as change.

Figure 6:
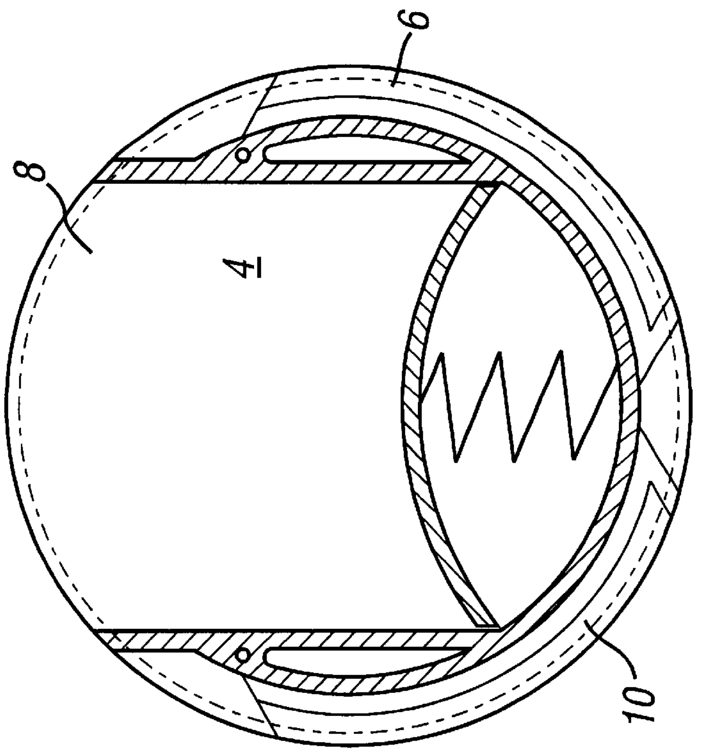
FIG. 6 illustrates a different configuration of storage regions in a drum of a banknote store.

In an alternative arrangement, for which a suitable drum structure is shown in FIG. 6, the drum may be provided with (a) a main storage region 8 serving as the cashbox, (b) a first small storage region 6 serving as an escrow, and (c) a second small storage region 10 for receiving banknotes deemed to be counterfeit, all the regions being arranged for storing multiple denominations. In operation, any banknotes for the current transaction are successively fed to the storage region 6. At the end of the transaction, these banknotes can be removed and either refunded to a customer, if for example the transaction is cancelled, or transferred to the main storage region 8. Means (not shown) may be provided for removing the notes from the region 6 as a single bundle, for example by stripping them from the drum 4. Alternatively, or additionally, the region 6 can be arranged to receive individual banknotes of selected denominations from a separate store, and then refund them in a bundle as change.

Any fraudulent banknotes are sent to the storage region 10, and are collected with the banknotes in the main cashbox region 8 when the banknote apparatus is emptied.

Accordingly, a banknote store according to the present invention may incorporate storage regions which collectively perform any one or more of the following functions:

(a) a main cashbox store for receiving banknotes which are preferably of a plurality of denominations, and probably non-refundable;

(b) a single-denomination store from which banknotes can be individually refunded;

(c) an intermediate store for temporarily storing notes received during a transaction, the notes being removable either collectively or individually;

(d) an temporary store for accumulating notes which are retrieved from storage individually, so that the notes can be accumulated as a bundle before being dispensed;

(e) a store for counterfeit banknotes.

The relative sizes of the storage regions would be designed so that they are suited for their intended functions.

Clearly, if none of the storage regions is intended for individual retrieval of banknotes, then the retrieval mechanism, for example the suction arrangements described above, can be omitted.

Although the drum in a banknote store according to the present invention is preferably capable of rotating continuously in either a single direction or in opposite directions as appropriate for receiving and/or discharging banknotes, it would be possible alternatively to use a partial rotation, i.e. a reciprocating or pivoting movement.

The illustrated embodiments each have a single region at which banknotes can be added to and extracted from the store. Alternatively there may be separate regions for addition and extraction, respectively, and/or multiple regions for one or both functions.

Although the illustrated embodiments each have a plurality of storage regions, some of the advantages of the invention (for example the provision of a large-capacity store with a small-size deposition system) can be achieved in an embodiment arranged to have only a single stack. This could be the main cash store, preferably multi-denominational, so no means for removing banknotes from the stack would be required. Alternatively, the store could be pre-loaded with banknotes and used for dispensing only, in which case no depositing means is required.

What is claimed:

1. A banknote store comprising a rotatable structure having a plurality of banknote-storing regions, each capable of storing a stack comprising a number of banknotes, the stacks being displaced around an axis of rotation of the structure and extending inwardly towards the axis of rotation, the store having means for rotating the structure so as to bring a selected stack into proximity to a means for delivering a banknote to the stack and for removing a banknote from the stack, the stack being arranged so that an increase in the number of banknotes in the stack results in the stack extending further inwardly towards the axis of rotation of the structure, the banknote store further including a belt means extending around the periphery of the structure and arranged to retain each stack in a respective banknote-storing region.

2. A banknote store as claimed in claim 1, arranged such that banknotes are deposited on, or removed from, a stack progressively as the structure rotates.

3. A banknote store as claimed in claim 1, wherein the structure is arranged to be rotated by movement of the belt means.

4. A banknote store as claimed in claim 1, wherein the removing means is operable to remove banknotes individually from each banknote-storing region.

5. A banknote store as claimed in claim 4, wherein the removing means comprises suction means.

6. A banknote store as claimed in claim 1, having a plurality of banknote-storing regions arranged for storing respective denominations.

7. A banknote store as claimed in claim 1, including a banknote-storing region arranged for storing multiple denominations.

8. A banknote store as claimed in claim 1, including a banknote-storing region which is a temporary store for successively receiving banknotes deposited during a transaction.

9. A banknote store as claimed in claim 1, including a banknote-storing region which is a temporary store for successively receiving stored banknotes for dispensing as a bundle.

10. A banknote store as claimed in claim 1, including a banknote-storing region which is arranged for receiving banknotes deemed to be forgeries.

11. A banknote store as claimed in claim 1, wherein each banknote-storing region is arranged to store banknotes so that a length of each banknote stored therein is substantially parallel to the axis of rotation.

12. A banknote store as claimed in claim 1, wherein the removing means is operable to remove banknotes individually from each banknote-storing region.

13. A banknote store as claimed in claim 12, wherein the removing means comprises suction means.

14. A banknote store as claimed in claim 1 wherein a leading edge of a banknote to be delivered is taken to a predetermined position on the structure and wherein the structure and the banknote rotate to place the banknote in a predetermined store and to place the leading edge between the structure and the belt means.

15. A banknote handling apparatus comprising a banknote validator and a banknote store, the banknote store comprising a rotatable structure having a plurality of banknote-storing regions, each capable of storing a stack comprising a number of banknotes, the stacks being displaced around the axis of rotation of the structure and extending inwardly towards the axis of rotation, the store having means for rotating the structure so as to bring a selected stack into proximity to a means for delivering a banknote to the stack and for removing a banknote from the stack, the stack being arranged so that an increase in the number of banknotes in the stack results in the stack extending further inwardly towards the axis of rotation of the structure, the banknote store further including a belt means extending around the periphery of the structure and arranged to retain each stack in a respective banknote-storing region, wherein the store is operable to receive banknotes validated by the banknote validator.

16. A banknote handling apparatus as claimed in claim 15, wherein the banknote store is removable from the apparatus in such a manner that any banknotes stored in the banknote-storing regions are retained by the store.

* * * * *